United States Patent
Wiegel et al.

(10) Patent No.: US 10,065,689 B2
(45) Date of Patent: Sep. 4, 2018

(54) PORTABLE TRAILER STANDS

(71) Applicants: Aaron J. Wiegel, Benton, WI (US);
Donald P. Grant, Dubuque, IA (US);
Jason Dondlinger, Bellevue, IA (US);
Joseph J. Dibiase, Woodbridge (CA);
Joseph Korman, Jr., Dubuqe, IA (US);
Lucas I. Paruch, Platteville, WI (US);
Ronald P. Snyder, Dubuqe, IA (US)

(72) Inventors: Aaron J. Wiegel, Benton, WI (US);
Donald P. Grant, Dubuque, IA (US);
Jason Dondlinger, Bellevue, IA (US);
Joseph J. Dibiase, Woodbridge (CA);
Joseph Korman, Jr., Dubuqe, IA (US);
Lucas I. Paruch, Platteville, WI (US);
Ronald P. Snyder, Dubuqe, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 987 days.

(21) Appl. No.: 13/715,512

(22) Filed: Dec. 14, 2012

(65) Prior Publication Data
US 2014/0166950 A1    Jun. 19, 2014

(51) Int. Cl.
*B66F 3/24*    (2006.01)
*B62D 53/08*    (2006.01)

(52) U.S. Cl.
CPC ................. *B62D 53/0864* (2013.01)

(58) Field of Classification Search
CPC .......... B60S 9/04; B60S 9/12; B62D 53/0857;
B62D 53/0864; B60D 1/245; B60D 1/248; B60D 1/015; B66F 3/10
(Continued)

(56) References Cited

U.S. PATENT DOCUMENTS 2,816,776 A * 12/1957 Nimtz ................ B62D 53/0857
267/66
3,180,282 A    4/1965 Gutridge et al.
(Continued)

OTHER PUBLICATIONS

Rite-Hite Europe, "Trailerjack", Jan. 1, 2000, 3 pages.
(Continued)

*Primary Examiner* — David Bryant
*Assistant Examiner* — Nirvana Deonauth
(74) *Attorney, Agent, or Firm* — Hanley, Flight & Zimmerman, LLC

(57) ABSTRACT

Example portable trailer stands for supporting parked trailers are disclosed herein. Some example portable trailer stands disclosed herein comprise two telescopic posts supporting a generally horizontal beam. Some examples include spring-loaded retractable wheels for selectively installing and removing the trailer stand from underneath a trailer left parked on a driveway. After being positioned under the trailer, the posts extend to lift the beam solidly up against the underside of the trailer. To accommodate conditions where the driveway is not parallel to the trailer's underside, some example posts can be lengthened independently and have angular play that allows the beam to tilt. In some examples, the horizontal axle of the trailer stand wheels is perpendicular to the beam so that the trailer stand can be readily installed from either the front or side of the trailer. Some examples have a kingpin-receiving groove in the beam or have some other kingpin-receiving feature.

23 Claims, 9 Drawing Sheets

(58) Field of Classification Search
USPC .................... 254/418–425; 280/476.1
See application file for complete search history.

(56) References Cited

U.S. PATENT DOCUMENTS

| | | | |
|---|---|---|---|
| 3,188,982 A | 6/1965 | Bergen et al. | |
| 3,189,307 A * | 6/1965 | Peterson | B61D 45/005 |
| | | | 403/14 |
| 3,235,211 A | 2/1966 | Robinson et al. | |
| 3,250,506 A | 5/1966 | Thouvenelle et al. | |
| 3,289,987 A | 12/1966 | Candlin, Jr. et al. | |
| 3,337,170 A | 8/1967 | Remy et al. | |
| 3,392,944 A | 7/1968 | Wyrough | |
| 3,490,723 A | 1/1970 | Atkinson | |
| 3,606,219 A | 9/1971 | Hammonds et al. | |
| 4,099,695 A | 7/1978 | Shinn, Jr. | |
| 4,718,800 A | 1/1988 | Engle | |
| 4,804,162 A * | 2/1989 | Rice | B25H 1/0007 |
| | | | 248/129 |
| 4,824,136 A * | 4/1989 | Bobby | B60S 9/04 |
| | | | 16/42 T |
| 5,340,082 A | 8/1994 | Holloway | |
| 5,868,379 A | 2/1999 | Ellis | |
| 6,089,544 A | 7/2000 | Ellis | |
| 8,714,533 B2 * | 5/2014 | Jenkins | B60J 5/00 |
| | | | 254/134 |
| 2003/0006599 A1 * | 1/2003 | VanDenberg | B60S 9/08 |
| | | | 280/766.1 |
| 2013/0001922 A1 * | 1/2013 | Kimener | B60D 1/665 |
| | | | 280/476.1 |
| 2013/0099464 A1 * | 4/2013 | Peterson | B60D 1/48 |
| | | | 280/407 |

OTHER PUBLICATIONS

STORAX, Product Brochure, Jan. 1, 2009, (16 pages).
STORAX, "Veiligheidsjukken," available at http://www.storaxlaadbruggen.nl/producten/Veiligheidsjukken/268/Veiligheidsjukken/Algemeen, accessed on Sep. 4, 2013, (2 pages).

* cited by examiner

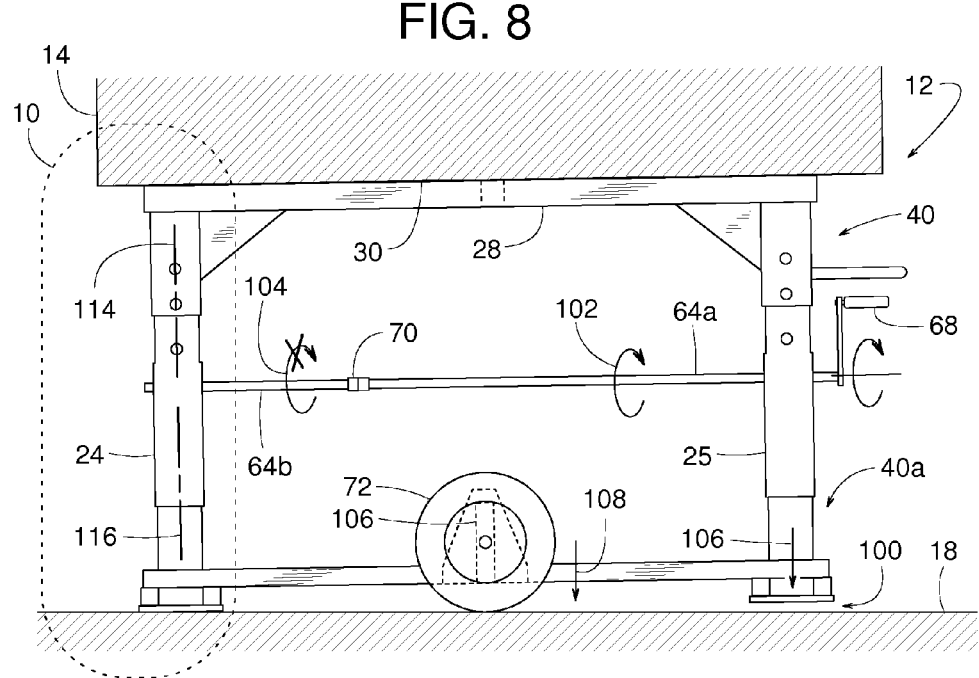
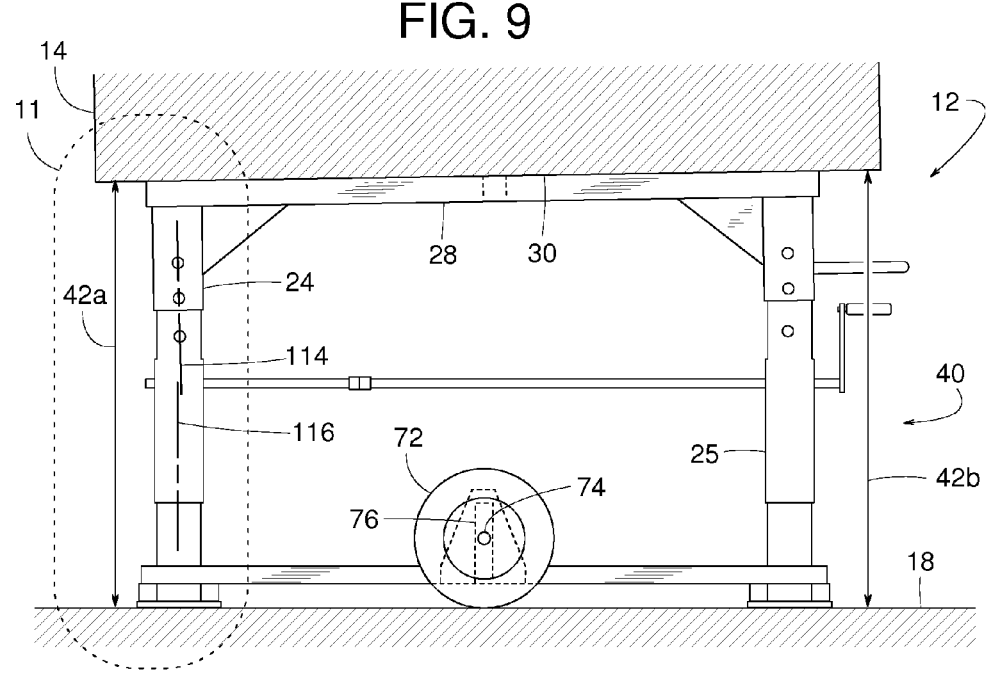

PORTABLE TRAILER STANDS

FIELD OF THE DISCLOSURE

This patent generally pertains to supporting parked trailers and more specifically to portable trailer stands.

BACKGROUND

Trucks often back their trailers into loading docks to load or unload the trailer's cargo from the rear end of the trailer. In some cases, the trailer's landing gear, near the front of the trailer, is deployed so that the truck (tractor) can depart while leaving the trailer parked at the dock. The landing gear then supports the front end of the trailer, which was previously supported by the truck. For additional support, sometimes a portable trailer stand is positioned underneath the front end of the trailer. A Rite-Hite Model TS-2000 is a good example of such a trailer stand.

BRIEF DESCRIPTION OF THE DRAWINGS

FIG. 8 is a front view similar to FIG. 7 but showing the example portable trailer stand further extended.

FIG. 9 is a front view similar to FIG. 8 but showing the example portable trailer stand fully extended up against the example trailer.

DETAILED DESCRIPTION

Figure 1:
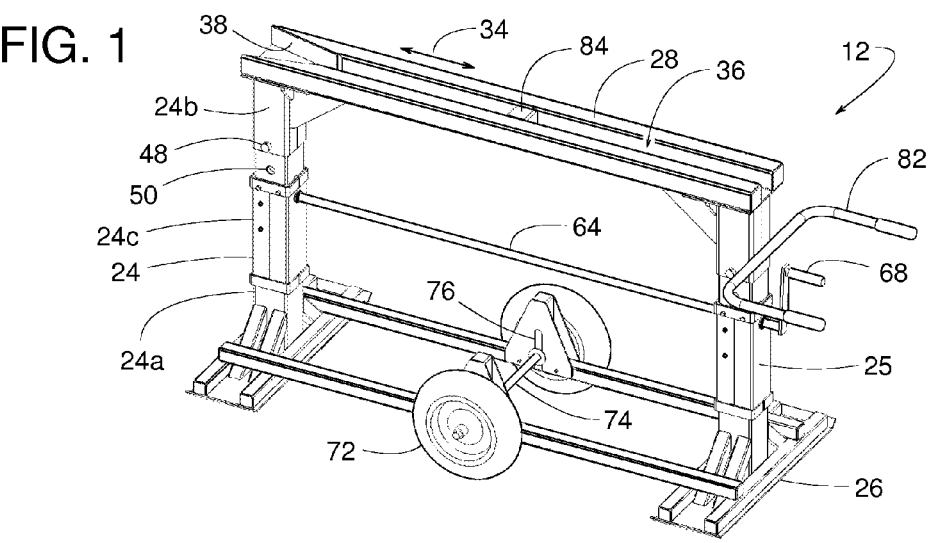
FIG. 1 is a perspective view of an example portable trailer stand constructed according to the teachings disclosed herein.
Figure 2:
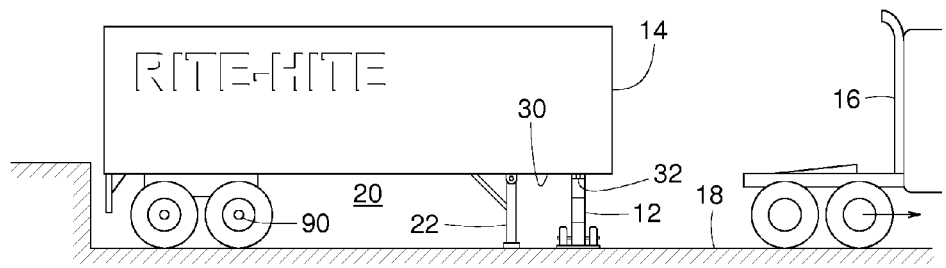
FIG. 2 is a side view of the example portable trailer stand supporting the front end of an example parked trailer.

FIGS. 1-14 show various views of an example portable trailer stand 12 used for supporting the front end of a parked trailer 14. FIG. 2 shows a truck 16 (also known as a tractor) having left trailer 14 parked on a driveway 18 of a loading dock 20. The trailer's onboard landing gear 22 is deployed to support the front end of trailer 14, which was previously supported by truck 16. Even though trailer 14 has its own landing gear for support, trailer stand 12 helps stabilize trailer 14 and provides backup support should the trailer's landing gear 22 collapse or otherwise fail.

Although the illustrated examples show trailer stand 12 being used at a loading dock, trailer stand 12 can actually be used for supporting trailer 14 on any driveway. The term, "driveway" refers to any surface upon which a trailer can travel or park. Examples of a driveway include, but are not limited to, a parking lot, a yard, a road, a shoulder of a road, a platform, a deck, etc. The term, "portable," when used with reference to trailer stand 12 means that trailer stand 12 includes at least one wheel for wheeling trailer stand along a driveway from one location to another, e.g., from underneath one trailer to underneath another one.

In some examples, trailer stand 12 comprises a first post 24 and a second post 25 extending between a base 26 and a beam 28. In some examples, the first post 24 and the second post 25 are vertically elongate. Beam 28 is just one example of an upper support member adapted to selectively engage an underside 30 of trailer 14. In some examples, underside 30 includes a kingpin 32 normally used for coupling trailer 14 to truck 16. The term, "beam," means any structural member which is horizontally elongate in a longitudinal direction 34. In some examples, the longitudinal direction 34 extends along a line connecting the first post 24 and the second post 25. Examples of beam 28 include, but are not limited to, one or more pieces of rectangular tubing, I-beam, angle iron, channel, plate, bar, etc. Some examples of beam 28 have a kingpin-receiving groove 36 with a tapered lead-in surface 38. Groove 36 extends in longitudinal direction 34. Groove 36 engaging kingpin 32 of underside 30 helps hold beam 28 in a desired location underneath trailer 14. Lead-in surface 38 helps guide kingpin 32 into groove 36 as trailer stand 12 is wheeled into position. In addition or alternatively, in some examples, the upper support member for engaging underside 30 comprises one or more spaced-apart plates, platforms or pads, e.g., one pad atop post 24 and another pad atop post 25.

Figure 3:
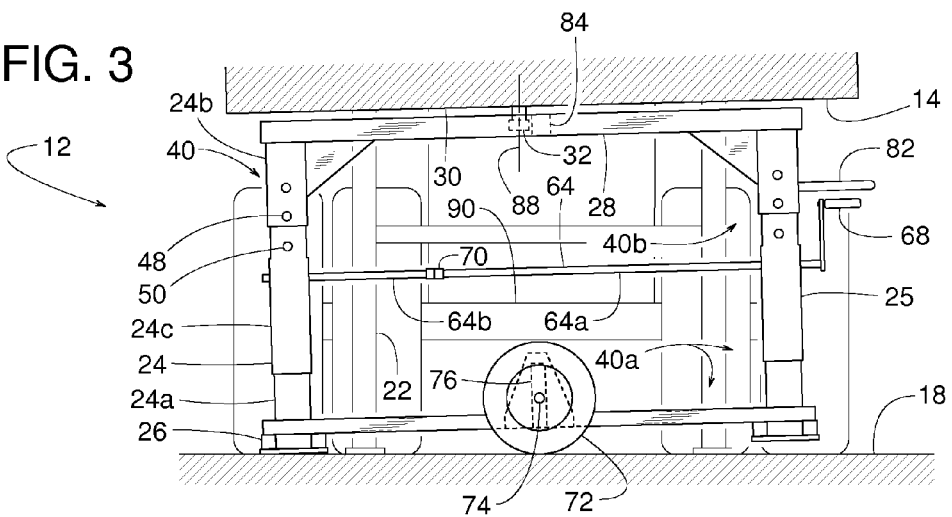
FIG. 3 is a front view of the example portable trailer stand installed underneath the example trailer.
Figure 4:
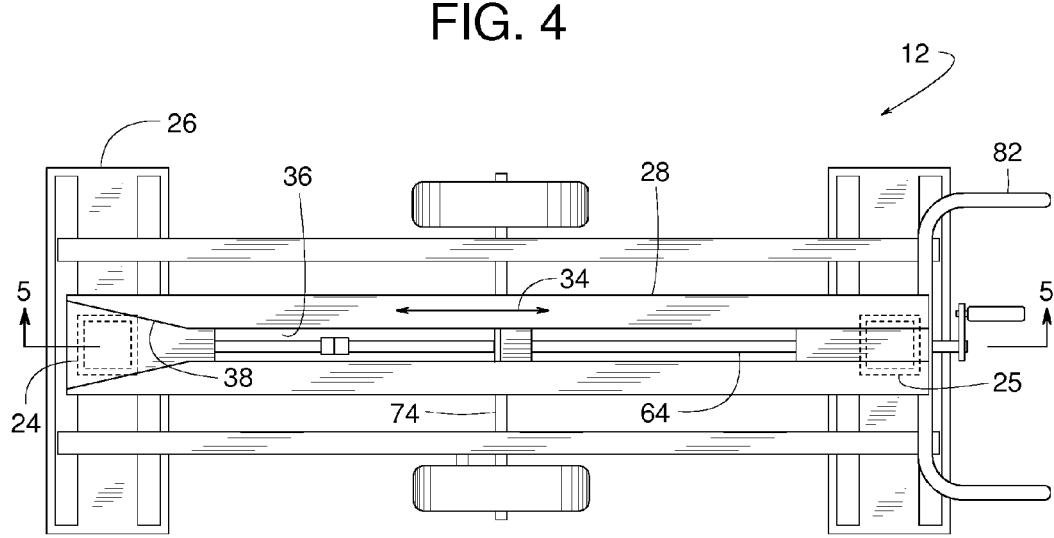
FIG. 4 is a top view of the example portable trailer stand.
Figure 5:
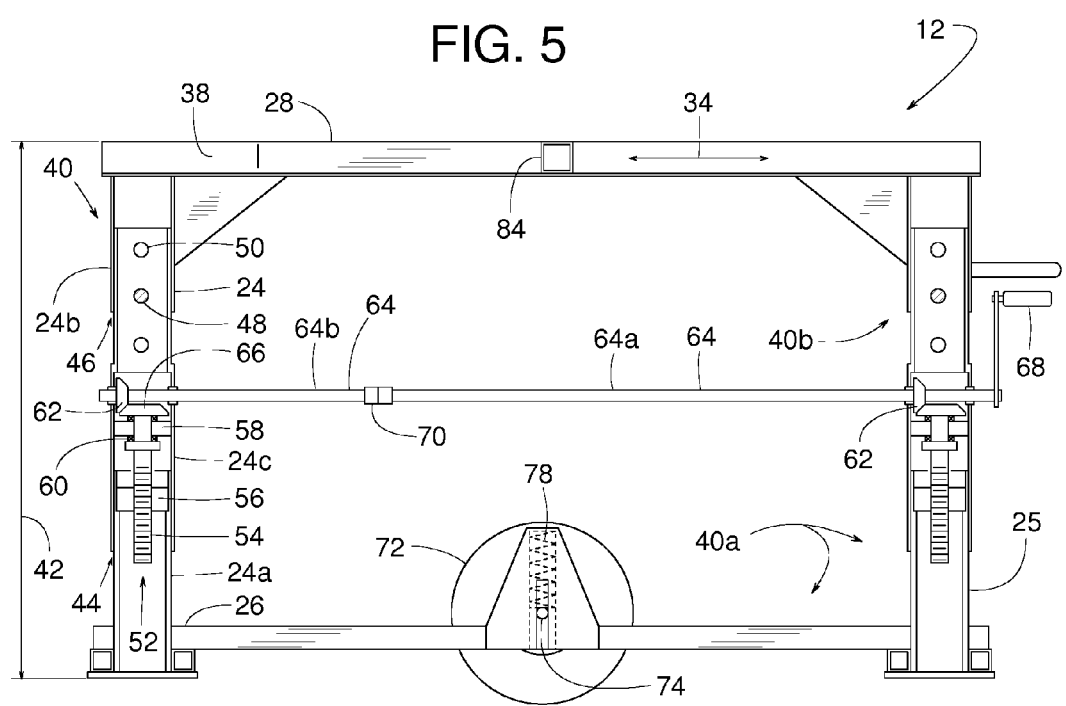
FIG. 5 is a cross-sectional view taken along line 5-5 of FIG. 4.
Figure 6:
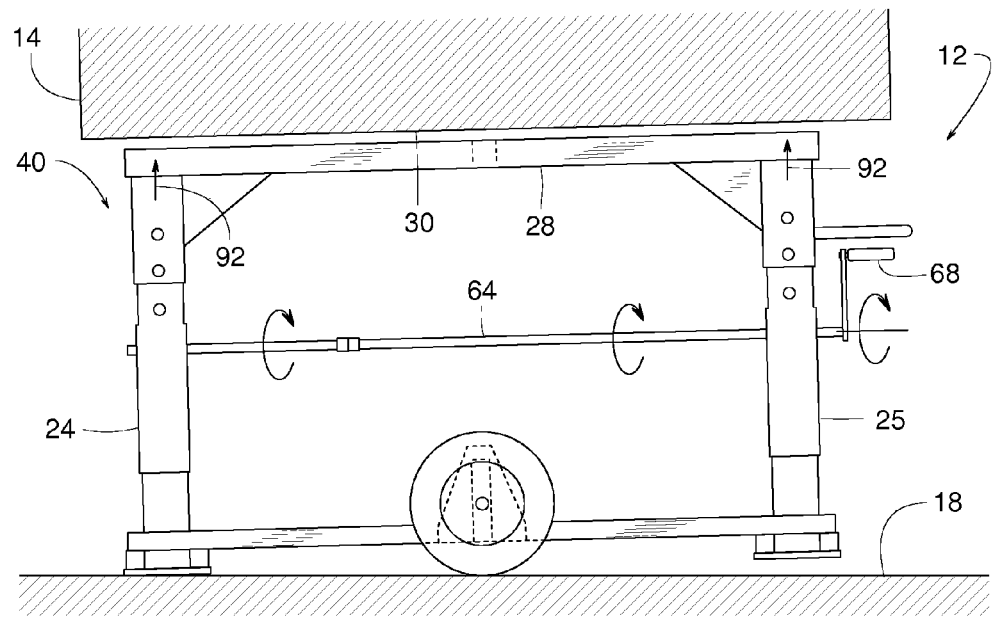
FIG. 6 is a front view similar to FIG. 3 but with parts of the example trailer omitted for clarity.
Figure 7:
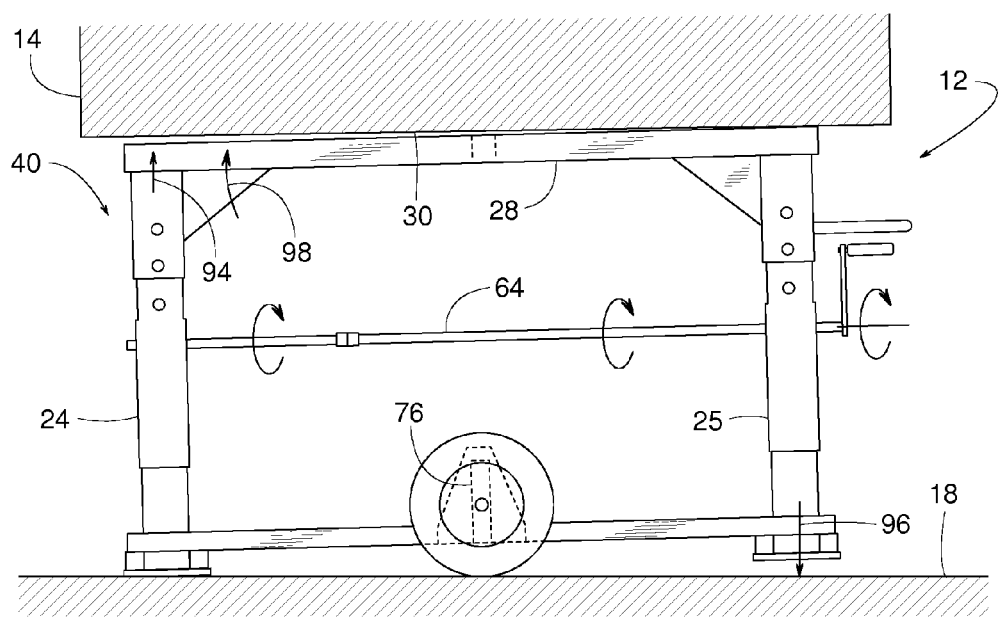
FIG. 7 is a front view similar to FIG. 6 but showing the example portable trailer stand partially extended.

To fit underneath trailers of various sizes, in some examples, posts 24 and 25 are telescopic in a vertically elongate direction to create a frame 40 that provides trailer stand 12 with an adjustable height 42. Frame 40, in some examples, comprises base 26 and posts 24 and 25, wherein a lower portion 40a of frame 40 includes base 26, and an upper portion 40b of frame 40 supports beam 28 (or some other trailer-engaging upper support member). In some examples, posts 24 and 25 are independently adjustable for situations where the trailer's underside 30 is not parallel to driveway 18. FIGS. 3 and 6-11, for instance, illustrate such a situation where underside 30 is at a lateral incline relative to driveway 18. It should be noted that FIGS. 6-9 are similar to FIG. 3, and FIGS. 3 and 6 are virtually identical; however, certain portions of trailer 14 are omitted in FIGS. 6-9 to more clearly show trailer stand 12.

In some examples, post 24 comprises a lower section 24*a* rigidly attached to base 26 and an upper section 24*b* rigidly attached to beam 28. In this example, an intermediate section 24*c* provides a telescopic coupling between sections 24*a* and 24*b*. In some examples, a first telescopic connection 44 is between lower section 24*a* and intermediate section 24*c*, and a second telescopic connection 46 is between intermediate section 24*c* and upper section 24*b*. A removable pin 48 and a series of holes 50 in sections 24*b* and 24*c* provide means for discrete incremental vertical adjustment between upper section 24*b* and intermediate section 24*c*. A jack 52 (e.g., hydraulic cylinder, pneumatic cylinder, jackscrew, etc.) is for adjusting the vertical position of intermediate section 24*c* relative to lower section 24*a*.

In the illustrated example, jack 52 is a jackscrew mechanism comprising a jackscrew 54 screwed into a nut 56 (nut 56 represents any internally threaded part). Nut 56 is stationary relative to lower section 24*a*. An internal block 58 fixed to intermediate section 24*c* with thrust and/or radial bearings 60 allows jackscrew 54 to rotate while maintaining jackscrew 54 at a fixed vertical position relative to intermediate section 24*c*. Rotating jackscrew 54 adjusts the vertical distance between block 58 and nut 56 and thus adjusts the combined vertical length of sections 24*a* and 24*c* and ultimately adjusts the trailer stand's overall height 42.

To rotate jackscrew 54, in some examples, a bevel gear 62 keyed or otherwise fixed to a rotatable shaft 64 meshes with another bevel gear 66 attached to an upper end of jackscrew 54. Rotating shaft 64 via a manually operated crank 68, or some other rotating means (e.g., a motor), rotates jackscrew 54 through gears 62 and 66. Thus, manually rotating crank 68 adjusts the trailer stand's height 42.

In the illustrated example, posts 24 and 25 are similar in construction and function. Each has a bevel gear 62 on shaft 64 so that turning crank 68 adjusts the height of both posts 24 and 25. In some examples, posts 24 and 25 extend and retract in unison. As mentioned earlier, some examples of posts 24 and 25 can be adjusted to different heights for situations where the trailer's underside is at an incline relative to driveway 18. In some examples, for instance, shaft 64 comprises a slip connection 70 (e.g., a disengageable coupling, separable coupling, slip coupling, slip clutch, torque-limiting shaft coupling, etc.) coupling a first shaft segment 64*a* to a second shaft segment 64*b*. Under low torque, shaft segments 64*a* and 64*b* rotate as a unit to adjust the heights of posts 24 and 25 evenly. Above a predetermined torque threshold, slip connection 70 releases to allow relative rotation between shaft segments 64*a* and 64*b*. Examples of slip connection 70 include, but are not limited to, a disengageable coupling as provided by Dayton Superior Products of Troy, Ohio; a slip clutch as provided by Ondrives U.S. Corporation of Freeport, N.Y.; and a slip clutch as provided by McMaster-Carr of Elmhurst, Ill. If uneven clearance between driveway 18 and underside 30 restrains the extension of post 24 before post 25, slip connection 70 allows shaft segment 64*a* to continue rotating and extending post 25 even though shaft segment 64*b* cannot rotate any further in the lift direction.

In some examples, trailer stand 12 includes one or more spring loaded, driveway-engaging wheels 72 for wheeling trailer stand 12 from one position to another. The spring loaded feature allows wheels 72 to retract when trailer stand 12 is expanded solidly between driveway 18 and the trailer's underside 30. In some examples, trailer stand 12 comprises two wheels 72 mounted to a trailer stand axle 74. Axle 74 is substantially perpendicular (e.g., rotationally offset by a range of between 80 and 100100 degrees) to longitudinal direction 34 and slides vertically within a slot 76 of frame 40. A compression spring 78 pushes axle 74 toward the bottom of slot 76 with sufficient force to overcome the weight of trailer stand 12. This allows wheels 72 to extend below base 26 of frame 40 so that during repositioning of trailer stand 12, wheels 72 can readily roll while carrying the weight of frame 40 just above driveway 18. Once in a desired position under trailer 14, vertically extending frame 40 via crank 68 compresses trailer stand 12 between driveway 18 and the trailer's underside 30. The compression provides sufficient force to overcome spring 78, thus axle 74 retracts within slot 76 to retract wheels 72 until base 26 rests solidly against driveway 18.

Figure 12:
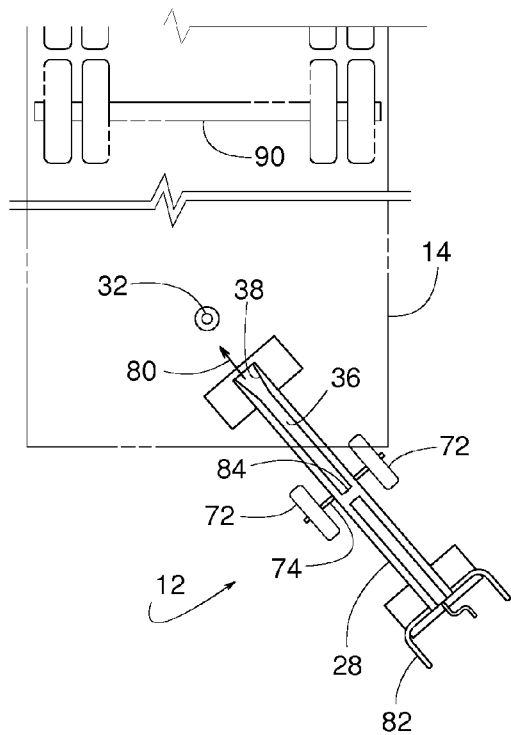
FIG. 12 is a top view of the example portable trailer stand being installed underneath the example trailer.
Figure 13:
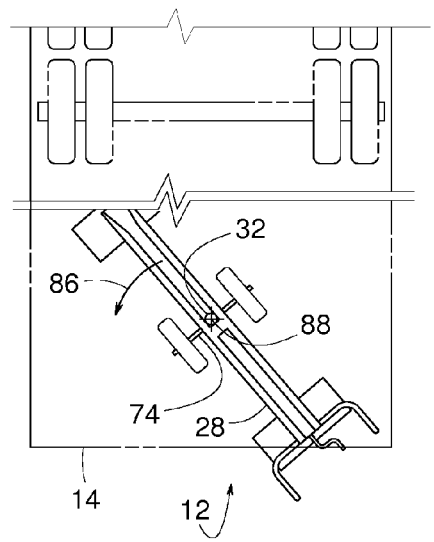
FIG. 13 is a top view similar to FIG. 12 but showing the example portable trailer stand being repositioned underneath the example trailer.
Figure 14:
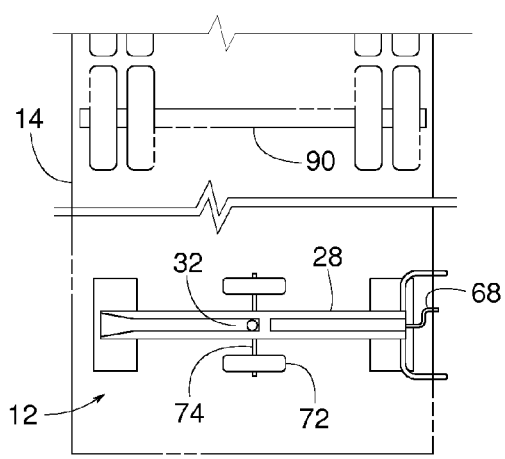
FIG. 14 is a top view similar to FIGS. 12 and 13 but showing the example portable trailer stand in the same position as shown in FIGS. 2 and 3.

One example sequence of operation is as follows. Arrow 80 of FIG. 12 represents manually pushing, pulling or otherwise wheeling portable trailer stand 12 underneath trailer 14. A handle 82 helps in manually maneuvering trailer stand 12. Capturing kingpin 32 within in groove 36 helps guide beam 28 to a desired location underneath trailer 14. In some examples, a stop block 84 engages kingpin 32 to help center kingpin 32 approximately midway along the length of beam 28 and to align kingpin 32 directly above axle 74. Arrow 86 of FIG. 13 represents rotating portable trailer stand 12 about a generally vertical axis 88 so that trailer stand axle 74 is not parallel to a rear trailer axle 90 of trailer 14. In some examples, trailer stand 12 is rotated until axle 74 is approximately perpendicular to trailer axle 90, as shown in FIG. 14, so beam 28 extends nearly across, or even all the way across, the overall width of trailer 14. In some examples, axis 88 is defined by a vertical centerline of kingpin 32. In some examples, axis 88 is perpendicular to and intersects trailer stand axle 74.

The location of axis 88, the angular relationship of axles 74 and 90, and the angular relationship of trailer stand axle 74 and longitudinal direction 34 provide appreciable benefits. Axis 88 being perpendicular to and intersecting trailer stand axle 74 allows wheels 72 to readily "spin" or rotate about a common center point approximately midway between the two wheels 72. Axis 88 being collinear with the longitudinal centerline of kingpin 32 allows kingpin 32 to guide the rotation of trailer stand 12 about a single fixed point of rotation without significant adverse drifting or translation of trailer stand 12. Trailer stand axle 74 being perpendicular to longitudinal direction 34 (perpendicular to beam 28), allows a trailer stand 12 with a relatively long beam 28 to be wheeled into position even when there is limited space for approaching trailer 14 from its side.

Once trailer stand 12 is in position underneath trailer 14, as shown in FIGS. 6 and 14, crank 68 is rotated to begin vertically extending frame 40 and thereby increasing the overall height of trailer stand 12. Arrows 92 of FIG. 6 represent vertically extending frame 40 before beam 28 engages the trailer's underside 30.

In the illustrated example, after the frame's initial extension brings the right end of beam 28 (right end as viewed in FIG. 7) in contact with the trailer's underside 30, further frame extension (indicated by arrows 94 and 96) tilts beam 28, as indicated by arrow 98. Thus, arrows 94, 96 and 98 represent tilting beam 28 while vertically extending frame 40.

Further extension of frame 40, brings the left end of beam 28 (left end as viewed in FIGS. 7 and 8) in contact with the trailer's underside 30, as shown in FIG. 8. With trailer stand 12 in the condition shown in FIG. 8, post 24 is restrained between driveway 18 and the trailer's underside 30, so post 24 can no longer extend. However, due to underside 30 being tilted relative to driveway 18, post 25 still has room to extend (note clearance 100 underneath post 25). So, further turning crank 68 in the lift direction, rotates shaft segment 64a to extend post 25, but since post 24 has no room for expansion, shaft segment 64b stops turning. Arrow 102 represents shaft segment 64a rotating, and crossed arrow 104 represents shaft segment 64b not rotating. Slip connection 70 allows the rotation of shaft segment 64a relative to shaft segment 64b. Consequently, frame 40 extends vertically as post 25 lengthens, as indicated by arrow 106 of FIG. 8. As post 25 extends, the upward pressure of driveway 18 against wheels 72 forces axle 74 to slide upward relative to slot 106, whereby wheels 72 retract. Wheels 72 retracting is shown in FIG. 8, wherein arrow 108 represents moving lower portion 40a of frame 40 down relative to trailer stand axle 74 and doing so while vertically extending frame 40.

Eventually, wheels 72 are fully retracted and posts 24 and 25 are fully extended such that trailer stand 12 is solidly in place between driveway 18 and trailer 14, as shown in FIG. 9. This can happen even if driveway 18 is not perfectly parallel to the trailer's underside 30. However, to extend trailer stand 12 from its configuration shown in FIG. 8 to that of FIG. 9, frame 40 will undergo some skewing to allow for the non-parallel relationship between driveway 18 and underside 30. In the illustrated example, it should be noted in FIG. 9 that one adjustable height 42a at the left end of beam 28 is less than another adjustable height 42b at the right end of beam 28 (i.e., heights 42a and 42b deviate from each other).

Figure 10:
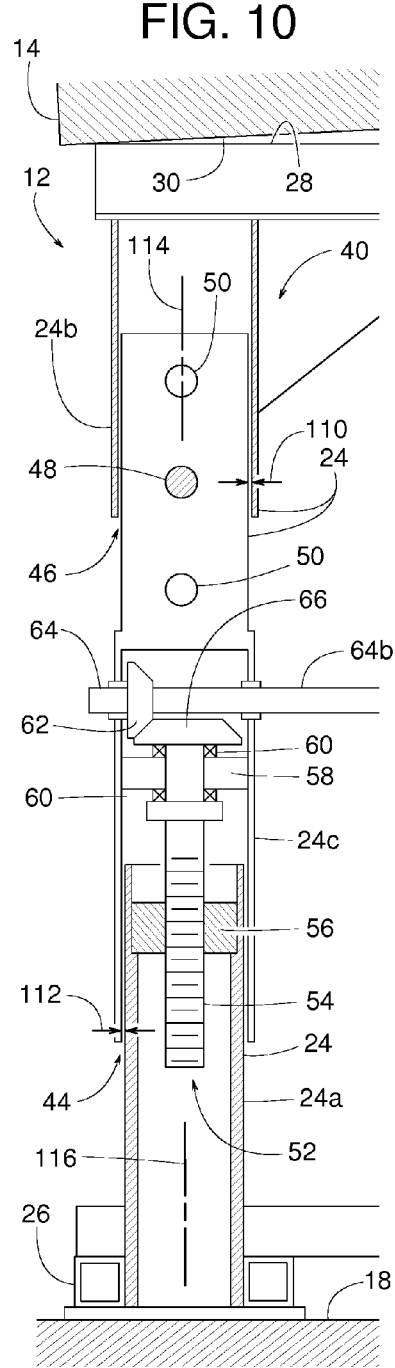
FIG. 10 is a front cross-sectional view taken generally along line 5-5 of FIG. 4 but only showing the portion in circle-10 of FIG. 8.
Figure 11:
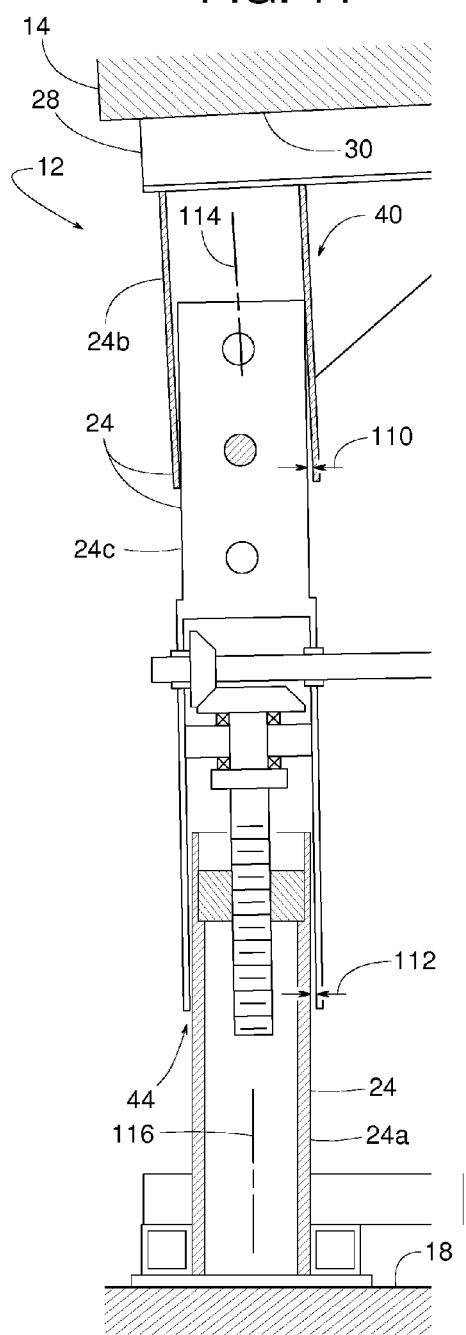
FIG. 11 is a front cross-sectional view taken generally along line 5-5 of FIG. 4 but only showing the portion in circle-11 of FIG. 9.

Accommodating non-parallel surfaces of driveway 18 and underside 30 can be accomplished by providing frame 40 with at least some angular play between each post's upper section 24b and lower section 24a. The term, "angular play" refers to two connected parts (e.g., sections 24a and 24b) being able to tilt relative to each other. In the example illustrated in FIGS. 10 and 11, most of the angular play between sections 24a and 24b occurs at an area of clearance 110 where upper section 24b fits telescopically over intermediate section 24c. In addition or alternatively, angular play occurs at an area of clearance 112 where intermediate section 24c fits telescopically over lower section 24a. The angular play at area of clearance 110 and/or area of clearance 112 renders post 24 selectively configurable to an angled configuration (FIGS. 9 and 11) and a straighter configuration (FIGS. 8 and 10). With upper section 24b having an upper longitudinal centerline 114 and lower section 24a having a lower longitudinal centerline 116, the two centerlines 114 and 116 are substantially collinear when post 24 is in the straighter configuration. In the angled configuration, upper longitudinal centerline 114 is tilted relative to lower longitudinal centerline 116.

In some examples, clearance 112 is reduced (e.g, minimized) to avoid angular binding between jackscrew 54 and nut 56, thus a preferred location of angular play is at clearance 110 where upper section 24b connects to intermediate section 24c. In some examples, there is less angular play at clearance 112 than at clearance 110. In some examples, clearance 110 is appreciably greater than clearance 112 for a greater range of angular play, and pin 48 facilitates pivotal movement of upper section 24b without detrimental binding of parts. Some example posts have only two telescopically connected sections with angular play therebetween. Such examples posts do not have an intermediate post.

Figure 15:
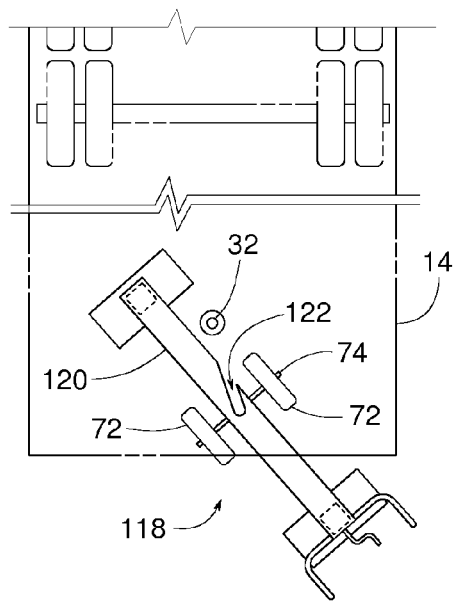
FIG. 15 is a top view similar to FIG. 12 but showing another example portable trailer stand constructed according to the teachings disclosed herein.
Figure 16:
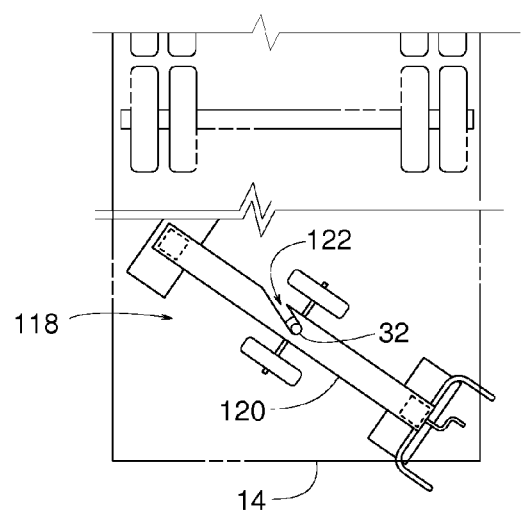
FIG. 16 is a top view similar to FIG. 13 but showing the example portable trailer stand of FIG. 15.
Figure 17:
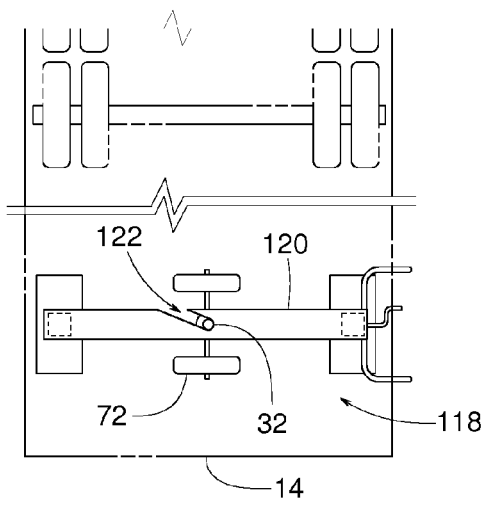
FIG. 17 is a top view similar to FIG. 14 but showing the example portable trailer stand of FIG. 15.

In another example, shown in FIGS. 15-17, a portable trailer stand 118 is similar in structure and function as trailer stand 12; however, trailer stand 118 includes a beam 120 with an angled notch 122 instead of groove 36. Notch 122 provides a kingpin-receiving feature that helps in positioning trailer stand 118 in relation to trailer 14. Trailer stand 118 can be installed underneath trailer 14 in a manner similar to the method used for trailer stand 12, wherein FIGS. 15, 16 and 17 correspond to FIGS. 12, 13 and 14, respectively.

Figure 18:
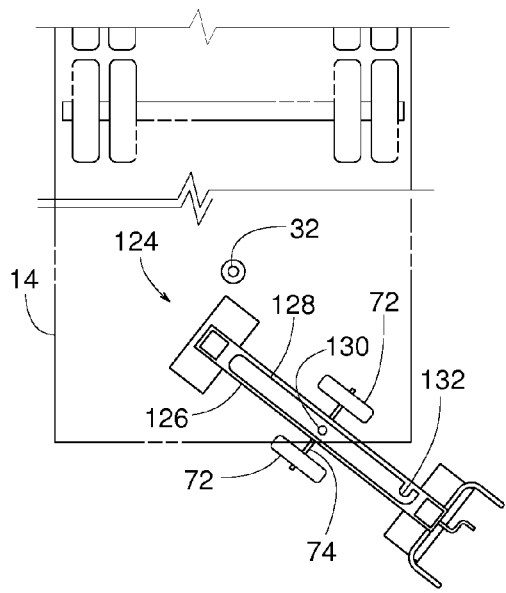
FIG. 18 is a top view similar to FIG. 12 but showing yet another example portable trailer stand constructed according to the teachings disclosed herein.
Figure 19:
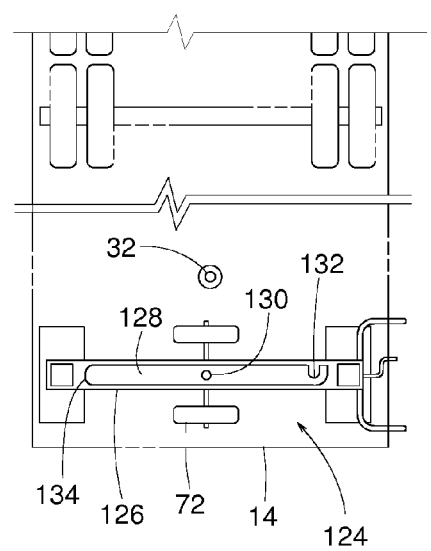
FIG. 19 is a top view similar to FIG. 13 but showing the example portable trailer stand of FIG. 18.
Figure 20:
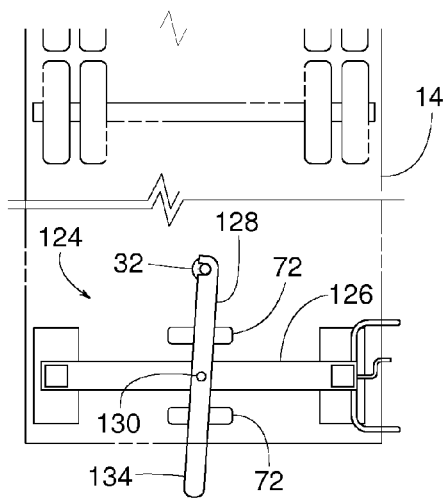
FIG. 20 is a top view similar to FIG. 14 but showing the example portable trailer stand of FIG. 18.

In another example, shown in FIGS. 18-20, a portable trailer stand 124 is similar in structure and function as trailer stands 12 and 118; however, trailer stand 124 includes a beam 126 with a pivotal arm 128 that can pivot about a pin 130 that connects arm 128 to beam 126. Arm 128 includes a kingpin-receiving feature in the form of a notch 132. Arm 128 allows trailer stand 124 to be positioned closer to the front of trailer 14 while kingpin 32 in notch 132 helps hold trailer stand 124 in place. In some examples, trailer stand 124 includes multiple similar arms for engaging kingpin 32 from different angles.

An example sequence of operation involves manually wheeling trailer stand 124 underneath trailer 14, as shown in FIG. 18. Trailer stand 124 is then positioned as shown in FIG. 19. To help hold trailer stand in this position, arm 128 is rotated manually or by some other rotating means to capture kingpin 32 within notch 132, as shown in FIG. 20. In some examples, a handle end 134 of arm 128 allows a person to readily rotate arm 128 into position.

Figure 21:
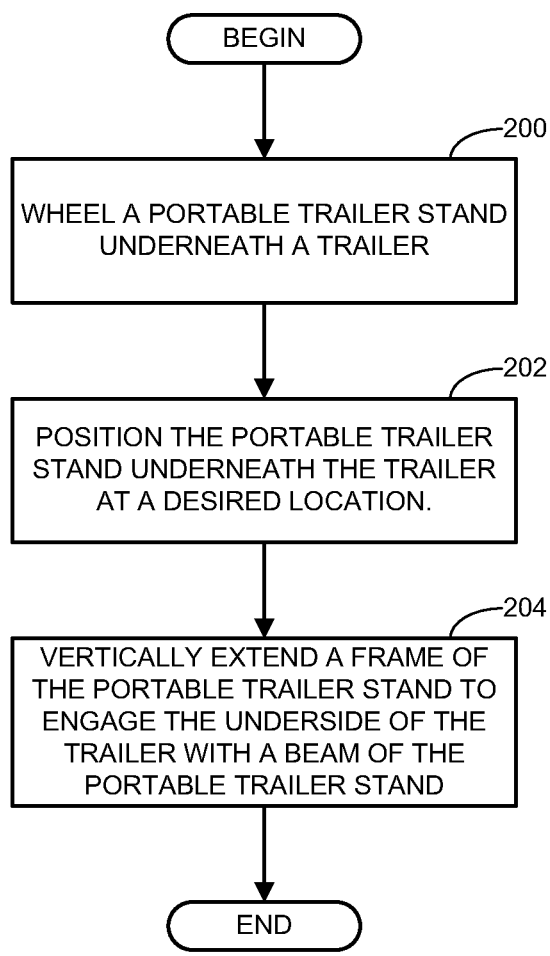
FIG. 21 is a flow chart diagram representative of an example method to use the example portable trailer stand of FIGS. 1-20.

FIG. 21 is a flow chart diagram representative of an example method to use a portable trailer stand (e.g., the portable trailer stand 12) to support a trailer (e.g., the trailer 14). For purposes of this disclosure, the example method of FIG. 21 is described primarily in connection with FIGS. 1-17. However, many other methods of implementing the example method of FIG. 21 may be employed. For example, the order of execution of certain blocks may be changed, and/or some of the blocks described may be changed, eliminated, sub-divided, or combined.

The example method begins by wheeling a portable trailer stand underneath the trailer (block 200) and positioning the portable trailer stand underneath the trailer at a desired location (block 202). In some examples, positioning the portable trailer stand is assisted by capturing a kingpin (e.g., the kingpin 32) within in a groove of an elongate beam on the portable trailer stand (e.g., the groove 36 of beam 28). In some examples, positioning the portable trailer stand includes rotating the portable trailer stand about a generally vertical axis such that an axle of the trailer stand (e.g., the axle 74) is not parallel with an axle of the trailer (e.g., the trailer axle 90). Once the portable trailer stand is in position (block 202), the example process includes vertically extending a frame (e.g., the frame 40) of the portable trailer stand to engage the underside of the trailer with the beam (block 204). In some examples, vertically extending the frame includes increasing the overall height of the portable trailer stand. In some examples, extending the frame vertically includes moving a lower portion of the frame down relative to the portable trailer stand axle. In some such examples, each post (e.g., the posts 24 and 25) of the portable trailer stand is extended simultaneously until the beam engages the underside of the trailer. In some such examples, the frame is vertically extended after the beam engages the underside of the trailer (e.g., when one post pushed the beam against the underside of the trailer before the other post).

Example portable trailer stands for supporting a trailer parked on a driveway are disclosed herein. In some examples, the trailer has an underside, includes a frame to provide the portable trailer stand with an adjustable height. In some examples, the portable trailer stand includes a beam to position on top of the frame. In some examples, the beam is to engage the underside of the trailer. In some examples, the beam is elongate in a longitudinal direction. In some examples, the example trailer stand further includes a trailer stand axle to be attached to the frame below the beam. In some such examples, the trailer stand axle is substantially perpendicular to the longitudinal direction. Some example trailer stands also include a wheel to be mounted to the trailer stand axle.

In some examples, the beam is to define a kingpin-receiving groove extending in the longitudinal direction. In some examples, the beam is further to define a tapered lead-in surface leading to the kingpin-receiving groove. In some examples, the frame includes an upper portion and a lower portion, the beam is attached or to be attached to the upper portion, the trailer stand axle is attached or to be attached to the lower portion, and the upper portion is vertically movable relative to the lower portion. In some examples, the trailer stand axle is to be vertically movable relative to the lower portion. In some examples, the portable trailer stand further includes first and second jacks to be coupled to the frame. The first and second jacks are to vary the adjustable height of the portable trailer stand. In some such examples, the portable trailer stand also includes a rotatable shaft to be supported by the frame. The first jack of some such examples comprises a first jackscrew mechanism. The second jack of some such examples comprises a second jackscrew mechanism. The rotatable shaft of some such examples is to be coupled to the first jackscrew mechanism and the second jackscrew mechanism. In some examples, the rotatable shaft is elongate in the longitudinal direction. In some examples, the portable trailer stand further includes a slip connection to be attached to the rotatable shaft. In some examples, the adjustable height of the portable trailer stand at a first end of the beam deviates from the adjustable height of the portable trailer stand at a second end of the beam opposite the first end. In some examples, the portable trailer stand further includes an arm which is movable horizontally relative to the beam. The arm of some such examples has a kingpin-receiving feature which is sized to engage a kingpin protruding downward from the underside of the trailer.

Other example portable trailer stands for supporting a trailer parked on a driveway are disclosed. The trailer has an underside that is not necessarily parallel to the driveway. The portable trailer stand of some such examples includes a first vertically elongate telescopic post. The first telescopic post of some such examples includes an upper section with an upper longitudinal centerline and a lower section with a lower longitudinal centerline. The upper section of some such examples is telescopically coupled to the lower section with angular play therebetween. The angular play of some such examples renders the first telescopic post selectively configurable to an angled configuration and a straighter configuration. The upper longitudinal centerline of some such examples is substantially collinear with the lower longitudinal centerline when the first telescopic post is in the straighter configuration. The upper longitudinal centerline of some such examples is tilted relative to the lower longitudinal centerline when the first telescopic post is in the angled configuration.

Some example portable trailer stands also include a second vertically elongate telescopic post and spaced apart from the first telescopic post. Some such example portable trailer stands include an upper support member connected to at least one of the first telescopic post or the second telescopic post. The upper support member of some such examples having selective engagement and disengagement conditions with respect to the underside of the trailer. Some such portable trailer stands also include a wheel coupled to the first telescopic post and the second telescopic post. The wheel is engageable with the driveway.

In some examples, the first telescopic post and the second telescopic post are to deviate in vertical length when the first telescopic post is in the angled configuration. In some examples, the first telescopic post and the second telescopic post are to be substantially equal in vertical length when the first telescopic post is in the straighter configuration. In some examples, the upper support member is a beam to extend from the upper section of the first telescopic post to the second telescopic post. In some examples, the beam is elongate in a longitudinal direction. In some examples, the beam is to define a kingpin-receiving groove extending in the longitudinal direction. In some such examples, the beam is further to define a tapered lead-in surface leading to the kingpin-receiving groove. In some examples, the portable trailer stand further includes a first jackscrew mechanism to be disposed within the first telescopic post and a second jackscrew mechanism to be disposed within the second telescopic post. In some examples, the portable trailer stand further includes a rotatable shaft to be supported by the first telescopic post and the second telescopic post. In some such examples, the rotatable shaft is coupled to the first jackscrew mechanism and the second jackscrew mechanism. In some examples, the upper support member is a beam to extend in a longitudinal direction from the upper section of the first telescopic post to the second telescopic post. In some such examples, the rotatable shaft is elongate in the longitudinal direction. In some examples, the portable trailer stand also includes a slip connection attached to the rotatable shaft. In some examples, the portable trailer stand also includes an arm to be movable relative to the upper support member. The arm in some such examples has a kingpin-receiving feature sized to engage a kingpin protruding downward from the underside of the trailer.

A portable trailer stand to support a trailer parked in a driveway are disclosed. In some examples, the portable trailer stands include a frame having an adjustable height and a beam to be assembled to the top of the frame to engage an underside of the trailer. In some examples, the trailer stands include a trailer stand axle to be assembled to the frame below the beam. The trailer stand axle in some such examples to be substantially perpendicular to a longitudinal direction of the beam. In some examples, the portable trailer stand further includes a wheel to be assembled to the trailer stand axle.

Example methods to use a portable trailer stand to support a trailer are disclosed herein. In some examples, the trailer includes a trailer axle. In some examples, the portable trailer stand includes a frame supporting the trailer stand axle to which at least one wheel is mounted for wheeling the portable trailer stand in position. Some example methods include wheeling the portable trailer stand underneath the trailer, rotating the portable trailer stand about a generally vertical axis so that the trailer stand axle is not parallel to the trailer axle, and vertically extending the frame to increase an overall height of the portable trailer stand.

In some examples, the portable trailer stand includes a beam. Some example methods further include positioning the beam underneath the trailer such that the beam engages an underside of the trailer. The beam in some such examples extends across most of an overall width of the trailer. Some example methods further include positioning the beam underneath the trailer such that the beam engages an underside of the trailer, and moving a lower portion of the frame down relative to the trailer stand axle. In some examples, the methods further include positioning the beam underneath the trailer such that the beam engages an underside of the trailer, and tilting the beam while vertically extending the frame. In some examples, the methods further include positioning the beam underneath the trailer such that the beam engages an underside of the trailer, and vertically extending the frame before and after the beam engages the underside of the trailer. In some examples, the methods further include rotating the portable trailer stand about the generally vertical axis so that the trailer stand axle is substantially perpendicular to the trailer axle.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A portable trailer stand to support a trailer parked on a driveway, the trailer having an underside, the portable trailer stand comprising:
   a frame to provide the portable trailer stand with an adjustable height;
   an elongate beam atop the frame, the beam to engage the underside of the trailer, the beam having a first end and a second end opposite the first end, a length of the beam between the first and second ends being substantially longer than a width of the beam, the beam defining a kingpin-receiving groove extending from the first end of the beam towards the second end, a length of the kingpin-receiving groove being greater than a width of the kingpin-receiving groove;
   first and second jacks, the first and second jacks to vary the adjustable height of the portable trailer stand;
   a rotatable shaft supported by the frame, the first jack including a first jackscrew, the second jack including a second jackscrew, the rotatable shaft coupled to the first jackscrew and the second jackscrew;
   a disengageable coupling attached to the rotatable shaft, the disengageable coupling enables adjustment of the first jack independent of the second jack;
   a block within the kingpin-receiving groove, the block to engage with a kingpin on the underside of the trailer when the portable trailer stand is supporting the trailer;
   a trailer stand axle attached to the frame, the trailer stand axle positioned directly below a point on the beam that is closer to the block than to either of the first or second ends of the beam, a length of the trailer stand axle being substantially perpendicular to the length of the beam; and
   a wheel mounted to the trailer stand axle.

2. The portable trailer stand of claim 1, wherein the beam further defines a tapered lead-in surface at the first end leading to the kingpin-receiving groove.

3. The portable trailer stand of claim 1, wherein the frame includes an upper portion and a lower portion, the beam being attached to the upper portion, the trailer stand axle being attached to the lower portion, and the upper portion being vertically movable relative to the lower portion.

4. The portable trailer stand of claim 3, wherein the trailer stand axle is vertically movable relative to the lower portion.

5. The portable trailer stand of claim 1, wherein the rotatable shaft is elongate in a direction corresponding to the length of the beam.

6. The portable trailer stand of claim 1, wherein the adjustable height of the portable trailer stand at the first end of the beam is to deviate from the adjustable height of the portable trailer stand at the second end of the beam opposite the first end.

7. The portable trailer stand of claim 1, wherein the frame is to be self-supporting on the driveway independent of the wheel.

8. The portable trailer stand of claim 1, wherein the length of the beam is to span most of an overall width of the trailer.

9. The portable trailer stand of claim 1, wherein the block is to center the kingpin approximately midway along the length of the beam when the kingpin engages the block.

10. A portable trailer stand for supporting a trailer parked on a driveway, the trailer having an underside that is not necessarily parallel to the driveway, the portable trailer stand comprising:
    a first vertically elongate telescopic post, the first telescopic post including an upper section with an upper longitudinal centerline and a lower section with a lower longitudinal centerline, the upper section being telescopically coupled to the lower section with angular play therebetween, the angular play rendering the first telescopic post selectively configurable to an angled configuration and a straighter configuration, the upper longitudinal centerline being substantially collinear with the lower longitudinal centerline when the first telescopic post is in the straighter configuration, the upper longitudinal centerline being tilted relative to the lower longitudinal centerline when the first telescopic post is in the angled configuration;
    a second vertically elongate telescopic post spaced apart from the first telescopic post;
    an elongate upper support member connected to the first telescopic post and the second telescopic post, the upper support member having selective engagement and disengagement conditions with respect to the underside of the trailer, wherein an elongate length of each of the first telescopic post, the second telescopic post, and the upper support member is contained within a common vertical plane when the portable trailer stand is supporting the trailer, the upper support member including a kingpin-receiving groove extending through a length of the upper support member;
    a block within the kingpin-receiving groove to stop passage of a kingpin through a full length of the kingpin-receiving groove; and
    a wheel coupled to the first telescopic post and the second telescopic post via an axle defining an axis of rotation for the wheel, the axis of rotation being substantially perpendicular to the vertical plane when the portable trailer stand is supporting the trailer, the wheel engageable with the driveway.

11. The portable trailer stand of claim 10, wherein the first telescopic post and the second telescopic post deviate in vertical length when the first telescopic post is in the angled configuration.

12. The portable trailer stand of claim 10, wherein the first telescopic post and the second telescopic post are substantially equal in vertical length when the first telescopic post is in the straighter configuration.

13. The portable trailer stand of claim 10, wherein the upper support member is a beam extending from the upper section of the first telescopic post to the second telescopic post.

14. The portable trailer stand of claim 13, wherein the beam further defines a tapered lead-in surface leading to the kingpin-receiving groove.

15. The portable trailer stand of claim 10, further including a first jackscrew disposed within the first telescopic post and a second jackscrew disposed within the second telescopic post.

16. The portable trailer stand of claim 15, further including a rotatable shaft supported by the first telescopic post and the second telescopic post, the rotatable shaft being coupled to both the first jackscrew and the second jackscrew.

17. The portable trailer stand of claim 16, wherein the upper support member is a beam extending in a longitudinal direction from the upper section of the first telescopic post to the second telescopic post, and the rotatable shaft is elongate in the longitudinal direction.

18. The portable trailer stand of claim 16, further including a disengageable coupling attached to the rotatable shaft.

19. The portable trailer stand of claim 10, further including an arm movable relative to the upper support member, the arm having a kingpin-receiving feature sized to engage the kingpin protruding downward from the underside of the trailer.

20. The portable trailer stand of claim 19, wherein the arm is rotatable about a vertical axis.

21. The portable trailer stand of claim 10, wherein the upper support member is a beam having a first end and a second end opposite the first end, the first end being attached to the upper section of the first telescopic post and the second end being attached to the upper section of the second telescopic post, a length of the beam being greater than a spacing of the first and second telescopic posts.

22. A portable trailer stand to support a trailer parked in a driveway comprising:
    a frame having an adjustable height, the frame including a first post and a second post spaced apart from the first post;
    a beam mountable to a top of the first and second posts to engage an underside of the trailer, the beam to be elongate in a longitudinal direction extending between the first post and the second post when assembled to the first and second posts, the beam defining a kingpin-receiving feature extending through a length of the beam between the first and second posts;
    a block within the kingpin-receiving feature to engage a kingpin on the underside of the trailer;
    a trailer stand axle mountable to the frame directly below the beam when the portable trailer stand is supporting the trailer, the trailer stand axle being substantially perpendicular to the longitudinal direction of the beam when the portable trailer stand is supporting the trailer, the trailer stand axle being directly under a vertical centerline of the kingpin when the portable trailer stand is supporting the trailer with the block engaged with the kingpin; and
    a wheel mountable to the trailer stand axle.

23. The portable trailer stand of claim 22, wherein the kingpin-receiving feature is a kingpin-receiving groove extending in the longitudinal direction between the first post and the second post.

* * * * *